(12) United States Patent
Keck et al.

(10) Patent No.: US 7,817,721 B2
(45) Date of Patent: Oct. 19, 2010

(54) POSTING STATUS DATA IN DIGITAL TRANSPORT STREAM PROCESSING

(75) Inventors: Wolfram H. Keck, Binfield (GB); Dean A. Emberson, Camberley (GB)

(73) Assignee: LSI Corporation, Milpitas, CA (US)

( * ) Notice: Subject to any disclaimer, the term of this patent is extended or adjusted under 35 U.S.C. 154(b) by 1682 days.

(21) Appl. No.: 10/438,584

(22) Filed: May 15, 2003

(65) Prior Publication Data
US 2004/0228414 A1 Nov. 18, 2004

(51) Int. Cl.
 H04N 7/12 (2006.01)
 H04J 3/24 (2006.01)
(52) U.S. Cl. .................................. 375/240.25; 726/13
(58) Field of Classification Search ............ 375/240.25, 375/240.28, 240.29; 726/13, 230–235; 725/89
See application file for complete search history.

(56) References Cited

U.S. PATENT DOCUMENTS

| | | | | | |
|---|---|---|---|---|---|
| 5,517,250 | A | * | 5/1996 | Hoogenboom et al. | 375/240.27 |
| 5,526,054 | A | * | 6/1996 | Greenfield et al. | 348/467 |
| 5,539,751 | A | * | 7/1996 | Sabel | 370/514 |
| 5,666,487 | A | * | 9/1997 | Goodman et al. | 709/246 |
| 5,684,804 | A | * | 11/1997 | Baronetti et al. | 370/509 |
| 5,835,591 | A | * | 11/1998 | Cochon et al. | 380/212 |
| 5,841,472 | A | * | 11/1998 | Rim et al. | 375/240.25 |
| 5,920,572 | A | * | 7/1999 | Washington et al. | 370/535 |
| 6,192,093 | B1 | * | 2/2001 | Lai et al. | 375/371 |
| 6,226,291 | B1 | * | 5/2001 | Chauvel et al. | 370/392 |
| 6,359,911 | B1 | * | 3/2002 | Movshovich et al. | 370/536 |
| 6,378,035 | B1 | * | 4/2002 | Parry et al. | 711/110 |
| 6,434,146 | B1 | * | 8/2002 | Movshovich et al. | 370/394 |
| 6,480,537 | B1 | * | 11/2002 | Agrawal et al. | 375/240 |
| 6,581,102 | B1 | * | 6/2003 | Amini et al. | 709/231 |
| 6,636,222 | B1 | * | 10/2003 | Valmiki et al. | 345/505 |
| 6,728,885 | B1 | * | 4/2004 | Taylor et al. | 726/24 |
| 6,925,572 | B1 | * | 8/2005 | Amit et al. | 726/15 |
| 6,983,323 | B2 | * | 1/2006 | Cantrell et al. | 709/225 |
| 7,035,335 | B1 | * | 4/2006 | Iacobelli et al. | 375/240.25 |
| 2001/0005398 | A1 | * | 6/2001 | Kono et al. | 375/240.25 |
| 2001/0040925 | A1 | * | 11/2001 | Abelard et al. | 375/240.26 |
| 2002/0064225 | A1 | * | 5/2002 | Furuta | 375/240.01 |
| 2002/0080771 | A1 | * | 6/2002 | Krumel | 370/352 |
| 2002/0083331 | A1 | * | 6/2002 | Krumel | 713/200 |
| 2002/0194506 | A1 | * | 12/2002 | Wiley et al. | 713/201 |
| 2003/0043919 | A1 | * | 3/2003 | Haddad | 375/240.25 |
| 2003/0156342 | A1 | * | 8/2003 | Yap et al. | 360/39 |

OTHER PUBLICATIONS

IBM Technical Disclosure No. 71-043242, "Cyclic Buffer in Local Store", Apr. 1971.*

* cited by examiner

*Primary Examiner*—Mehrdad Dastouri
*Assistant Examiner*—David N Werner
(74) *Attorney, Agent, or Firm*—Christopher P. Maiorana, PC (57) ABSTRACT

A method for processing a transport stream is disclosed. The method generally comprises the steps of (A) parsing the transport stream to separate a transport packet, (B) generating a plurality of status items for the transport packet, (C) writing a relevant portion of the transport packet and the status items together in a memory and (D) reading the relevant portion of the transport packet and the status items from the memory for post-parsing processing of the transport packet based upon the status items.

18 Claims, 10 Drawing Sheets

STATUS DATA ARRANGEMENT FOR MPEG-2 TRANSPORT PACKETS WITH SECTION STRUCTURED PAYLOAD

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | - | SPLICE FLAG | FLUSH | - | PAYLOAD TYPE | | | | PID FILT FAIL | - | PID INDEX | | | | | |
| 1 | - | - | - | - | POST ERROR STAT | DSC ERROR STAT | PRE ERROR STAT | CDI ERROR STAT | - | - | GLOB PKT FAIL | PID FILT FAIL | HEAD FILT FAIL | CC ERROR | PKT ERROR | SYNC LOSS |
| 2 | LMC1[15:0] | | | | | | | | | | | | | | | |
| 3 | LMC1[31:16] | | | | | | | | | | | | | | | |
| 4 | - | - | - | - | - | - | LMC1[41:32] | | | | | | | | | |
| 5 | LMC2[15:0] | | | | | | | | | | | | | | | |
| 6 | LMC2[31:16] | | | | | | | | | | | | | | | |
| 7 | - | - | - | - | - | - | LMC2[41:32] | | | | | | | | | |
| 8 | PCR[15:0] | | | | | | | | | | | | | | | |
| 9 | PCR[31:16] | | | | | | | | | | | | | | | |
| 10 | PCR VALID | - | - | - | - | - | PCR[41:32] | | | | | | | | | |
| 11 | ENC MODES USED | | | - | PES SCR CTL (ALWAYS 0) | | TRANS SCR CTL | | - | - | DSC MODES USED | | | | | |
| 12 | - | - | - | - | - | - | - | - | - | - | PREV OVERRUN | LAST OPEN | NUMBER PAYLOAD ITEMS (I.E NUMBER SELECTIONS) | | | |
| 13 | END SECTION 1 | | | | | | | | START SECTION 1 | | | | | | | |
| 14 | - | - | - | - | PREV OVERRUN | GLOB SECT FAIL | FILT FAIL | CRC FAIL | - | - | TID FILT FAIL | TID INDEX | | | | |
| 15 | FILTER STATUS[15:0] | | | | | | | | | | | | | | | |
| 16 | FILTER STATUS[31:16] | | | | | | | | | | | | | | | |
| 17-20 | STATUS SECTION 2 (SIMILAR TO SECTION 1; ONLY IF NUMBER PAYLOAD ITEMS >1) | | | | | | | | | | | | | | | |
| 21-24 | STATUS SECTION 3 (ONLY IF NUMBER PAYLOAD ITEMS >2) | | | | | | | | | | | | | | | |
| 25-28 | STATUS SECTION 4 (ONLY IF NUMBER PAYLOAD ITEMS >3) | | | | | | | | | | | | | | | |
| 29-32 | STATUS SECTION 5 (ONLY IF NUMBER PAYLOAD ITEMS >4) | | | | | | | | | | | | | | | |
| 33-36 | STATUS SECTION 6 (ONLY IF NUMBER PAYLOAD ITEMS >5) | | | | | | | | | | | | | | | |
| 37-40 | STATUS SECTION 7 (ONLY IF NUMBER PAYLOAD ITEMS >6) | | | | | | | | | | | | | | | |
| 41-44 | STATUS SECTION 8 (ONLY IF NUMBER PAYLOAD ITEMS >7) | | | | | | | | | | | | | | | |
| 45 | - | - | - | - | - | - | - | - | START OVERRUN (ONLY IF NUMBER PAYLOAD ITEMS=9) | | | | | | | |

FIG. 3

STATUS DATA ARRANGEMENT FOR MPEG TRANSPORT
PACKETS WITH PES STRUCTURED PAYLOAD

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | - | SPLICE FLAG | FLUSH | - | \multicolumn{4}{c}{PAYLOAD TYPE} | PID FILT FAIL | - | \multicolumn{6}{c}{PID INDEX} |
| 1 | - | - | - | - | POST ERROR STAT | DSC ERROR STAT | PRE ERROR STAT | CDI ERROR STAT | - | - | GLOB PKT FAIL | PID FILT FAIL | HEAD FILT FAIL | CC ERROR | PKT ERROR | SYNC LOSS |
| 2 | \multicolumn{16}{c}{LMC1[15:0]} |
| 3 | \multicolumn{16}{c}{LMC1[31:16]} |
| 4 | - | - | - | - | - | - | \multicolumn{10}{c}{LMC1[41:32]} |
| 5 | \multicolumn{16}{c}{LMC2[15:0]} |
| 6 | \multicolumn{16}{c}{LMC2[31:16]} |
| 7 | - | - | - | - | - | - | \multicolumn{10}{c}{LMC2[41:32]} |
| 8 | \multicolumn{16}{c}{PCR[15:0]} |
| 9 | \multicolumn{16}{c}{PCR[31:16]} |
| 10 | PCR VALID | - | - | - | - | - | \multicolumn{10}{c}{PCR[41:32]} |
| 11 | \multicolumn{3}{c}{ENC MODES USED} | - | \multicolumn{2}{c}{PES SCR CTL} | \multicolumn{2}{c}{TRANS SCR CTL} | - | - | \multicolumn{6}{c}{DSC MODES USED} |
| 12 | - | - | - | - | - | - | - | - | - | - | - | LAST OPEN | \multicolumn{4}{c}{NUMBER PAYLOAD ITEMS (0 IF AF ONLY, ELSE 1)} |
| 13 | \multicolumn{8}{c}{END PES} | \multicolumn{8}{c}{START PES} |
| 14 | - | - | - | - | BOUNDED | GLOB FILT FAIL | DATA FILT FAIL | PES FILT FAIL | - | - | BYTE 1 FILT FAIL | \multicolumn{5}{c}{BYTE 1 INDEX (FOR BUFFER ATTACHMENT)} |
| 15 | \multicolumn{16}{c}{DATA FILTER STATUS[15:0]} |
| 16 | \multicolumn{16}{c}{DATA FILTER STATUS[31:16]} |
| 17 | \multicolumn{16}{c}{-} |
| 18 | - | - | - | - | PREV BOUNDED | PREV GLOB FILT FAIL | PREV DATA FILT FAIL | PREV PES FILT FAIL | - | - | PREV BYTE 1 FILT FAIL | \multicolumn{5}{c}{PREV BYTE 1 INDEX (FOR BUFFER ATTACHMENT IN CASE OF STATUS DATA POSTING)} |
| 19 | \multicolumn{16}{c}{PREV DATA FILTER STATUS[15:0]} |
| 20 | \multicolumn{16}{c}{PREV DATA FILTER STATUS[31:16]} |

FIG. 4

TABLE II

| PLDSMODE | STATUS DATA APPENDED | STATUS WORDS POSTED |
|---|---|---|
| 00 | NONE | NONE |
| 01 | OVERRUN + CRC FAIL + DATA FILTER STATUS + TID FILTER FAIL + TID INDEX | 1a AND 2 |
| 10 | PLDSMODE = 01 + SCRAMBLING CONTROL | 1a, 2 AND 3 |
| 11 | RESERVED | NONE |

FIG. 5

TABLE III

| PLDSMODE | STATUS DATA APPENDED | STATUS WORDS POSTED |
|---|---|---|
| 00 | NONE | NONE |
| 01 | BOUNDED + DATA FILTER FAIL + DATA FILTER STATUS + PES FILTER FAIL + BYTE 1 FILTER FAIL + BYTE 1 INDEX | 1b AND 2 |
| 10 | PLDSMODE = 01 + SCRAMBLING CONTROL | 1b, 2 AND 3 |
| 11 | RESERVED | NONE |

FIG. 6

STATUS WORD 1a

| BITS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | RESERVED | | | | | | | | | | | | | | | |
| BITS | 31 | 30 | 29 | 28 | 27 | 26 | 25 | 24 | | 23 | 22 | 21 | | 20 | 19 | 18 | 17 | 16 |
| NAME | RESERVED | | | | OVER-RUN | RESERVED | | CRC FAIL | | RESERVED | | TID FILT FAIL | | TID INDEX | | | | |

FIG. 7

STATUS WORD 1b

| BITS | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|
| NAME | BYTE 1 INDEX | | | | | RESERVED | | | | | | | | | | | | | | | |
| BITS | 31 | 30 | 29 | 28 | 27 | | 26 | | 25 | | 24 | | 23 | 22 | | 21 | | | | | |
| NAME | RESERVED | | | | BOUNDED | | RESERVED | | DATA FILT FAIL | | PES FILT FAIL | | RESERVED | | | BYTE 1 FILT FAIL | | | | | |

FIG. 8

STATUS WORD 2

| BITS | 31 | | | | | | | | | | | | | | 0 |
|---|---|---|---|---|---|---|---|---|---|---|---|---|---|---|---|
| NAME | DATA FILTER STATUS [31:0] | | | | | | | | | | | | | | |

FIG. 9

STATUS WORD 3

| BITS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | RESERVED | | | | PES SCR. CTL. | | TRANS SCR. CTL. | | RESERVED | | | | | | | |
| BITS | 31 | 30 | 29 | 28 | 27 | 26 | 25 | 24 | 23 | 22 | 21 | 20 | 19 | 18 | 17 | 16 |
| NAME | RESERVED | | | | | | | | | | | | | | | |

FIG. 10

TABLE IV

| PKTSMODE | CONDITION FOR POSTING | STATUS DATA POSTED (IF CONDITION MET, ELSE NONE) | STATUS WORDS POSTED |
|---|---|---|---|
| 0000 | - | NONE | NONE |
| 0100 | (PID FILTER PASS) AND (VALID PCR) | PID INDEX + PCR + LMC | 4a, 5, 6, 7 AND 8a |
| 0101 | PID FILTER PASS | PID INDEX + FLUSH + SPLICE FLAG + SYNC LOSS + PKT ERROR + CC ERROR + HEADER FILTER FAIL | 4b |
| 0110 | PID FILTER PASS | SUPERSET OF 0100 AND 0101 | 4b, 5, 6, 7 AND 8a |
| 1000 | - | PID FILTER FAIL + PID INDEX + FLUSH +SPLICE FLAG + SYNC LOSS + PKT ERROR + CC ERROR + HEADER FILTER FAIL + GLOBAL PACKET FAIL + MODULE ERRORS | 4c |
| 1001 | - | PACKETS MODE = 1000 + SCRAMBLING CONTROL + ENCRIPTION MODES + DESCR. MODES | 4c, AND 9 |
| 1010 | - | PACKETS MODE = 1001 + PCR VALID + PCR + LMC1 + LMC2 | 4c, 5 (LMC1), 6 (LMC1), 5 (LMC2), 6 (LMC2), 7 AND 8b |
| 1011 | - | PACKETS MODE = 1010 + NUMBER PAYLOAD ITEMS + LAST OPEN | 4c, 5 (LMC1), 6 (LMC1), 5 (LMC2), 6 (LMC2), 7, 8b AND 10 |
| 1100 | - | LMC1 + LMC2 | 5 (LMC1), 6 (LMC1), 5 (LMC2), 6 (LMC2) |
| 0001, 0010, 0011, 0111, 1110, 1111 | RESERVED | | NONE |

FIG. 11

STATUS WORD 4a

| BITS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | RESERVED | | | | | | | | | | PID INDEX | | | | | |
| BITS | 31 | 30 | 29 | 28 | 27 | 26 | 25 | 24 | 23 | 22 | 21 | 20 | 19 | 18 | 17 | 16 |
| NAME | RESERVED | | | | | | | | | | | | | | | |

FIG. 12

STATUS WORD 4b

| BITS | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| NAME | SYNC LOSS | RES. | SPLICE FLAG | FLUSH | RESERVED | | | | | | | PID INDEX | | | | | |
| BITS | 31 | 30 | 29 | 28 | 27 | | 26 | 25 | 24 | 23 | 22 | 21 | 20 | 19 | | 18 | 17 |
| NAME | RESERVED | | | | | | | | | | | | | HEADER FILT FAIL | | CC ERROR | PKT ERROR |

FIG. 13

STATUS WORD 4b

| BITS | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| NAME | SYNC LOSS | RES. | SPLICE FLAG | FLUSH | RESERVED | | | | | PID FILT. FAIL | RES. | PID INDEX | | | | | |
| BITS | 31 | 30 | 29 | 28 | 27 | 26 | 25 | 24 | 23 | 22 | 21 | | 20 | 19 | | 18 | 17 |
| NAME | RES. | MODULE ERRORS | | | RES. | | GLOB PKT FAIL | | | | RES. | HEADER FILT FAIL | | CC ERROR | PKT ERROR | | |

FIG. 14

STATUS WORD 5

| BITS | 31 | | | | | | | | | | | | | | | 0 |
|---|---|---|---|---|---|---|---|---|---|---|---|---|---|---|---|---|
| NAME | LMC [31:0] | | | | | | | | | | | | | | | |

FIG. 15

STATUS WORD 6

| BITS | 31 | | | | | | | | | | 12 | 11 | | | 0 |
|---|---|---|---|---|---|---|---|---|---|---|---|---|---|---|---|
| NAME | RESERVED | | | | | | | | | | | LMC [41:32] | | | |

FIG. 16

STATUS WORD 7

| BITS | 31 | | | | | | | | | | | | | | 0 |
|---|---|---|---|---|---|---|---|---|---|---|---|---|---|---|---|
| NAME | PCR [31:0] | | | | | | | | | | | | | | |

FIG. 17

STATUS WORD 8a

| BITS | 31 | | | | | | | | | | 12 | 11 | | | 0 |
|---|---|---|---|---|---|---|---|---|---|---|---|---|---|---|---|
| NAME | RESERVED | | | | | | | | | | | PCR [41:32] | | | |

FIG. 18

STATUS WORD 8b

| BITS | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|
| NAME | DSC MODES USED | | | | | | RESERVED | | | | | | PCR [41:40] | | PCR [39:32] | | | | | | | |
| BITS | 31 | | 30 | | 29 | | 28 | | 27 | | 26 | | 25 | | 24 | | 23 | | 22 | | | |
| NAME | ENC. MODES USED | | | | | | RES. | | PES SCR.CTL. | | | | TRANS SCR.CTL. | | | | RESERVED | | | | | |

FIG. 19

STATUS WORD 9

| BITS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | ENC. MODES USED | | | RESERVED | PES SCR.CTL. | | TRANS SCR.CTL. | | RESERVED | | DSC. MODES USED | | | | | |
| BITS | 31 | 30 | 29 | 28 | 27 | 26 | 25 | 24 | 23 | 22 | 21 | | 20 | | 19 | 18 | 17 |
| NAME | RESERVED | | | | | | | | | | | | | | | | |

FIG. 20

STATUS WORD 10

| BITS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | RESERVED | | | | | | | | | | | LAST OPEN | NUMBER PAYLOAD ITEMS | | | |
| BITS | 31 | 30 | 29 | 28 | 27 | 26 | 25 | 24 | 23 | 22 | 21 | 20 | 19 | 18 | 17 | 16 |
| NAME | RESERVED | | | | | | | | | | | | | | | |

FIG. 21

POSTING STATUS DATA IN DIGITAL TRANSPORT STREAM PROCESSING

FIELD OF THE INVENTION

The present invention relates to digital video processing generally and, more particularly, to a method and/or circuit for posting status data for a transport stream.

BACKGROUND OF THE INVENTION

One of the main objectives of a set top box chip is to extract, decode and display audio and video. In order to do so, the set top box chip has to find relevant transport packets in the incoming bitstream (i.e., carrying audio and video for the program of interest), extract the audio/video payloads and pass the payloads on to the audio/video decoder portion of the set top box chip. Parsing of the incoming transport stream is done by the transport demultiplexer in the set top box chip. Moving Picture Experts Group (MPEG-2) transport streams are made up of transport packets with different packet identification (PID) values in the packet headers that differentiate between distinct substreams of data.

To be able to find transport packets carrying audio and video of the program of interest, together with other program components like teletext or subtitles, the transport demultiplexer has to know under what PID values to expect the different program components. To build up that information, the incoming bitstream carries service information (SI). The service information is carried in transport packets with specific IDs and has to be parsed by the transport demultiplexer to transform from raw packet data to meaningful tables. The meaningful tables lead to other tables, audio and video information.

A major task of transport stream processing in a set top box is to extract service information from the raw, incoming transport packets without prior knowledge (i.e., starting from fixed IDs and then extending according to table contents and user choices). Conventionally, the extraction task is tackled in a two step approach. In the first step, conventional dedicated transport hardware reduces the overall amount of data by discarding all data currently not of interest. Only SI data that has passed the hardware filtering steps in the transport block (i.e., a substantially reduced amount of data) is posted to buffers in an off-chip memory.

For data posting, the transport makes use of a memory interface in the set top box chip. Whenever hardware has posted a meaningful portion of data to a cyclic buffer, the hardware interrupts a host central processing unit (CPU) that then performs the second stage of processing. The host CPU reads posted data from the off-chip memory, analyses the data further and typically builds relevant tables from the raw data. The contents of the table are then used to adjust transport register settings to get audio and video to the A/V decoder.

While the two stage approach is a compromise between host CPU loading and flexible processing, the two stage approach creates substantial duplication of processing steps. In existing solutions, the second step has to re-do substantial portions of the filtering to differentiate between more than one table under a single PID and checking. A substantial amount of status data from the first step is simply lost in the data posting.

SUMMARY OF THE INVENTION

The present invention concerns a method for processing a transport stream. The method generally comprises the steps of (A) parsing the transport stream to separate a transport packet, (B) generating a plurality of status items for the transport packet, (C) writing a relevant portion of the transport packet and the status items together in a memory and (D) reading the relevant portion of the transport packet and the status items from the memory for post-parsing processing of the transport packet based upon the status items.

The objects, features and advantages of the present invention include providing a digital transport stream process and/or architecture that may (i) prevent a loss of status information while posting data, (ii) achieve a high overall efficiency, (iii) append status descriptors to actual payload data posted into external memory, (iv) be user programmable to identify up to a level of detail that status information is to be made available to a host processor, (v) simplify processing by the host processor, (vi) reduce host processor loading and/or (vii) ensure an optimum balance between hardware processing and driver software processing.

BRIEF DESCRIPTION OF THE DRAWINGS

These and other objects, features and advantages of the present invention will be apparent from the following detailed description and the appended claims and drawings in which:

FIG. 7 is an example layout of a status word 1a;

FIG. 12 is an example layout of a status word 4a;

FIG. 18 is an example layout of a status word 8a;

DETAILED DESCRIPTION OF THE PREFERRED EMBODIMENTS

Figure 1:
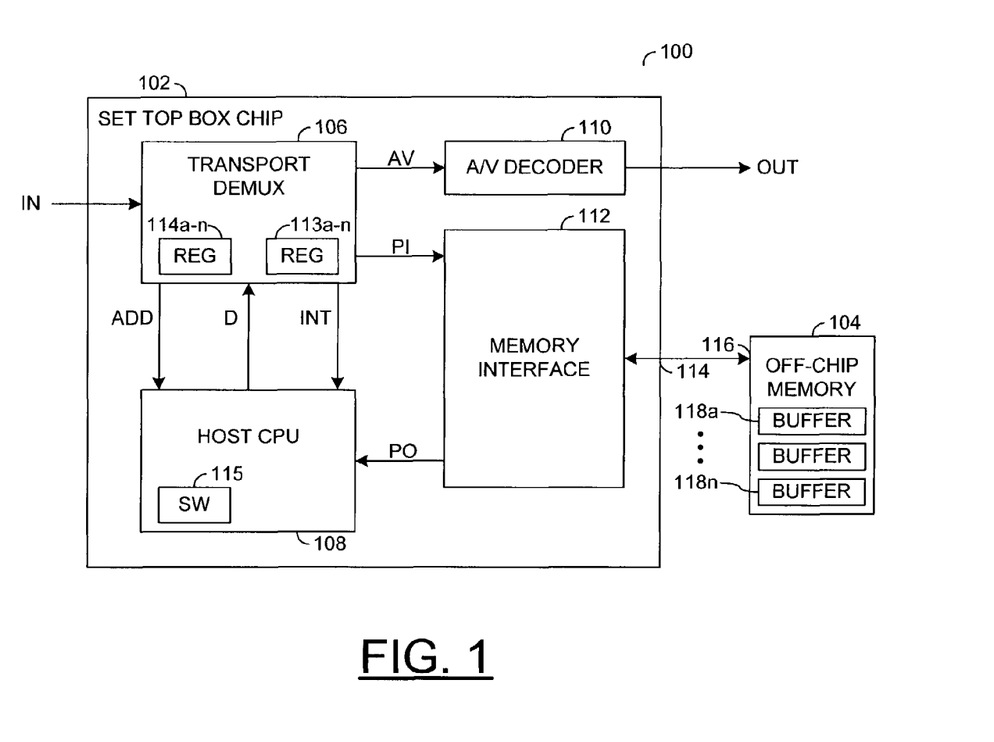
FIG. 1 is a block diagram of circuit in accordance with a preferred embodiment of the present invention.

Referring to FIG. 1, a block diagram of circuit 100 is shown in accordance with a preferred embodiment of the present invention. The circuit 100 generally comprises a chip or circuit 102 and a chip or circuit 104. The chip 102 may be implemented as a set-top-box (STB) chip. The STB chip 102 may be operational to perform transport demultiplexing on an input signal (e.g., IN). The input signal IN may be a video bitstream for a digital video signal. The chip 104 may be implemented as a memory chip. The memory chip 104 is generally fabricated as a separate chip than the STB chip 102.

The memory chip 104 may be operational to store data, information, status items and the like generated by the functions of the STB chip 102. The STB chip 102 may generate one or more output signals (e.g., OUT). Generally, the output signal OUT may have at least one video component and at least one separate audio component.

The STB chip 102 generally comprises a circuit or block 106, a circuit or block 108, a circuit or block 110 and a circuit or block 112. The circuit 106 may be implemented as a transport demultiplexer circuit. The transport demultiplexer circuit 106 may by configured to parse the input signal IN into audio/video signals (e.g., AV) transported to the circuit 110. The transport demultiplexer circuit 106 may provide posted information (e.g., PI) to the circuit 112. Programmable configuration information (e.g., D) for the transport demultiplexer circuit 106 may be stored in internal registers 113a-n. The transport demultiplexer circuit 106 may write address information (e.g., ADD) into internal registers 114a-n.

The circuit 108 may be implemented as a host central processor unit (CPU) circuit. The host CPU circuit 108 may be programmed with software 115 to operate on posted information (e.g., PO) received from the circuit 112 to perform post-parsing functions. The host CPU circuit 108 may read the address signal ADD to identify locations of the posted information PO in the memory circuit 104. Processed transport data may be used to set registers 113a-n in the transport demultiplexer circuit 106. An interrupt signal (e.g., INT) may be received by the host CPU circuit 108 from the transport demultiplexer circuit 106.

The circuit 110 may be implemented as an audio/video (A/V) decoder circuit. The A/V decoder circuit 110 may be configured to generate the signal OUT by decoding the audio/video signal AV.

The circuit 112 may be implemented as a memory interface circuit. The memory interface circuit 112 may provide an interface 114 for the STB circuit 102 to an interface 116 for the memory circuit 104. The memory interface circuit 112 may be configured to write posted information PI to the memory circuit 104 and read the posted information PO from the memory circuit 104.

The registers 114a-n may be operational as address pointer registers. Each address pointer register 114a-n may hold an address signal ADD generated by the transport demultiplexer circuit 106 and provide the addresses to the host CPU circuit 108. Each address signal ADD may identify where a set of posted information PI has been written in the memory circuit 104.

The memory circuit 104 may be arranged as multiple cyclical buffers 118a-n. Each of the cyclic buffers 118a-n may be sized to store sets of posted information PI. Each set generally comprises payload data parsed from the input signal IN (e.g., a transport stream) and associated data items.

The circuit 100 generally provides relevant status items and data closely coupled with actual payload data. Therefore, status items built up during transport hardware processing in the transport demultiplexer circuit 106 do not have to be rebuilt again by the driver software 115 thus unnecessarily loading the host CPU circuit 108. A relevant portion of payload data that has passed filtering, apart from audio and video using a dedicated interface, may be posted to the off-chip memory circuit 104 via the memory interface circuit 112. The off-chip memory circuit 104 portion used for transport data storage is generally organized in the cyclic buffers 118a-n. A one-to-one assignment may exist between the cyclic buffers 118a-n and data having a given PID. As such, each cyclic buffer 118a-n may only receives data from transport packets with a single PID (e.g., all payload data from a particular PID that has passed filtering may be posted to a particular cyclic buffer 118a-n).

The transport demultiplexer circuit 106 may post both actual payload data and status descriptors or items relating to the payload data to the same cyclic buffer 118a-n. The status items may immediately follow the payload data in an address range. The payload data and status items may be aligned to word boundaries to simplify access when writing or reading to or from the memory circuit 104.

The status item descriptor method generally provides a straight forward way to unambiguously tie together transport packet payload data and related status items. After having (i) posted the last portion of payload data with the appended status items to the memory circuit 104, (ii) updated the appropriate address pointers register 118a-n and (iii) interrupted the host CPU circuit 108, the driver software 115 may evaluate the status item descriptors read from the memory circuit 104 instead of performing steps to regenerate the status items.

By way of example, the status item descriptors may hold the outcome for all different hardware filters that may have been used in parallel in the transport demultiplexer circuit 106 on the input transport stream. Therefore, the driver software 115 may find out which filter made the transport packet payload pass or whether a 32-bit cyclic redundancy checking (CRC32) has passed or failed, thus freeing up the host CPU circuit 108 from duplicating tasks from the transport demultiplexer circuit 106. The descriptor approach may also overcome timing criticality of accessing status items. By posting the status items together with the transport packet payload, multiple sets (e.g., 2, 3 or more sets) of payloads and status items may be held together substantially simultaneously in the memory circuit 104. As such, the host CPU 108 may avoid an issue to react to a first transport packet payload and associated status items before a second transport packet payload with new status items become available.

Figure 2:
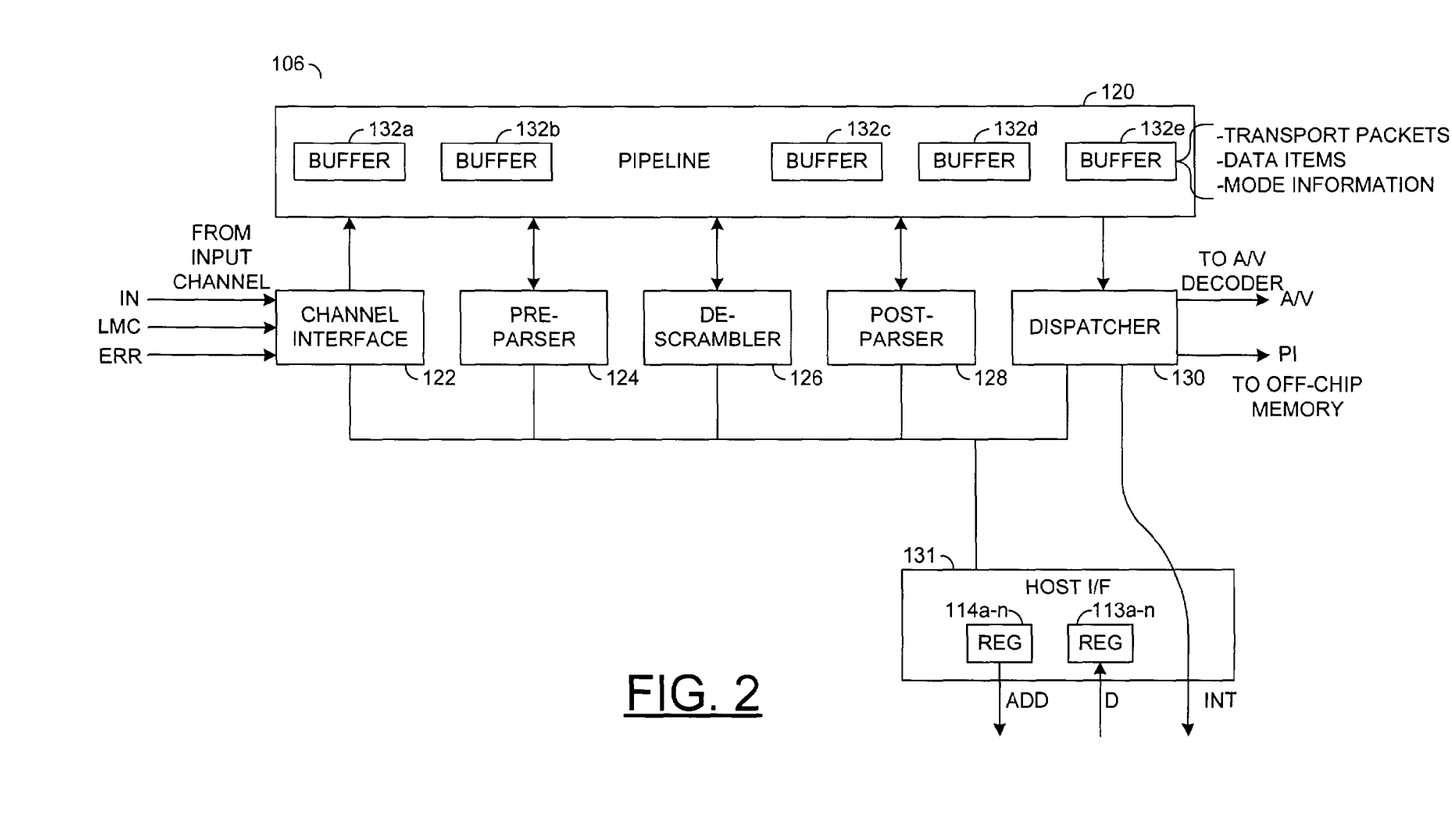
FIG. 2 is a block diagram of an example embodiment of a transport demultiplexer circuit.

Referring to FIG. 2, a block diagram of an example embodiment of the transport demultiplexer circuit 106 is shown. The transport demultiplexer circuit 106 generally comprises a circuit or block 120, a circuit or block 122, a circuit or block 124, a circuit or block 126, a circuit or block 128, a circuit or block 130 and a circuit or block 131. The transport stream input signal IN may be received by the circuit 122. The configuration signal D may be received by the circuit 131. The output signals AV, INT and PI may be generated by the circuit 130. The address signal ADD may be generated by the circuit 131. Each of the circuits 122-130 may form a stage of the transport demultiplexer circuit 106. The circuit 120 may be operational to pass information among the various stages in a pipeline fashion.

The circuit 120 may be implemented as a pipeline block. The pipeline block 120 generally comprises multiple circuits or blocks 132a-e. Each block 132a-e may be implemented as a memory buffer. Each memory buffer 132a-e may be sized to store a set comprising at least a transport packet and the associated status items. There may be a memory buffer 132a-e for each of the circuits 122-130.

The circuit 122 may be implemented as a channel interface block. The circuit 124 may be implemented as a pre-parser block. The circuit 126 may be implemented as a descrambler block. The circuit 128 may be implemented as a post-parser block. The circuit 130 may be implemented as a dispatcher block.

The circuit 131 may be implemented as a host interface (I/F) block. The host I/F block 131 may include the registers 113a-n and the registers 114a-n. The host I/F block 131 may be in communication with the other blocks 120-130 to transfer configuration information. The signal INT may be routed through the host I/F block 131 prior to delivery to the host CPU circuit 108.

Data from the transport stream input signal IN may be passed from one processing stage blocks 122-130 to the next trough the pipeline block 120. The pipeline concept may be implemented by "passing" the memory buffers 132*a-e* from one processing stage block 122-130 to another other. Each pipeline memory buffer 132*a-e* generally holds the data of a complete transport packet (e.g., 188 bytes for MPEG-2). In addition, the pipeline memory buffers 132*a-e* may also be used to pass status items and mode information from one processing stage block 122-130 to another. Passing the status items may result in each transport packet collecting more and more status data as the transport packets progresses through the different pipeline stage blocks 122-130. The status items may be stored in the memory buffers 132*a-e* immediately follows the actual transport packet data.

Transport packets generally enter the pipeline of the transport demultiplexer circuit 106 through the channel interface block 122. The channel interface block 122 may perform packet synchronization and write raw transport data in a transport portion of pipeline memory buffers 132*a-e*. The transport packets may then be sequentially processed by the pre-parser block 124, the descrambler block 126 and the post-parser block 128. The final pipeline stage, the dispatcher block 130, is generally responsible for passing data that has not been dropped during filtering steps in the preceding stages to either the off-chip memory circuit 104 for subsequent post-parsing processing by the host CPU circuit 108, the A/V decoder circuit 110, or both.

All pipeline processing stages generally work on a transport-packet-by-transport-packet basis. As soon as a stage 122-128 has finished processing a particular transport packet, the transport packet may be passed by the associated pipeline memory buffer 132*a-e* to the next pipeline stage 124-130 then wait for reception of the next transport packet from a predecessor stage 122-128. The pipeline memory buffer 132*a-e* at the end of the pipeline, associated with the processing of the dispatcher block 130, may be returned to the channel interface block 122 at the start of the pipeline to receive a new transport packet. The pipeline block 120 generally keeps together transport packet data and related status items and may retain all status information as additional status items are gradually built up by the different stages 122-130. Other pipeline implementations that retain all status data and pass the data along with the actual packet and payload data may be implemented to meet the design criteria of a particular application.

The channel interface block 122 is generally responsible for receiving incoming (e.g., MPEG-2) transport packets from the input signal IN into the pipeline memory buffers 132*a-e*. To be able to work on correctly aligned transport packets (e.g., write a first byte in a first pipeline memory location), the channel interface block 122 may acquire transport packet synchronization and may keep track of potential synchronization losses, both with programmable latencies provided by the host CPU circuit 108. On top of transport packet acquisition, the channel interface block 122 is generally responsible for time stamping incoming transport packets by capturing snapshots of a local master clock (e.g., LMC). The channel interface block 122 may be the only block that may see the original channel clock. All other processing in the other stages 124-130 may happen in another clock domain. If a demodulator front end chip (not shown) provides an error indication signal (e.g., ERR) from a forward error correction (FEC) check, the error signal ERR may also be captured by the channel interface block 122 to indicate the error condition to the successive stages 124-130. From a status data perspective, the channel interface block 122 generally adds transport packet oriented status items for (i) a synchronisation loss/acquisition item, (ii) local master clock LMC snapshots at two user programmable locations within the transport packet and (iii) a packet error item reflecting the external error signal ERR.

The pre-parser block 124 is generally responsible for all processing that may be done at a transport packet level prior to descrambling/decrypting. The pre-parser block 124 may perform PID filtering for MPEG-2 transport packets. In doing so, the pre-parser block 124 generally compares a PID value in the incoming transport packet against up to 64 user defined reference PID values. The reference values may be provided as register settings by the host CPU circuit 108. Given a total of 64 PID indexes (e.g., from 0 to 63), for each particular PID indexes a reference PID value may be specified and whether PID filtering is supposed to evaluate the user setting may be specified. Otherwise the particular PID index may be ignored, leading to less than 64 reference values.

If PID filtering fails, for example none of the enabled reference PID values match the stream value in the current transport packet, all successive processing stages 126-130 may ignore the packet and not perform any processing on the failed packet. In particular, no data may be posted to either the A/V decoder circuit 110 or the off-chip memory circuit 104. The first filtering step generally results in a drastic reduction of data passed on to the driver software 115 for additional processing.

If PID filtering finds a match between a stream value and one of the reference patterns, the pre-parser block 124 may record the PID index that led to the match. In a case of multiple matches, a first match in a user programmable order may be recorded. The PID index may be used for some or all further processing by determining what other user settings may be applicable for transport packets of a given PID index having a given PID value.

In addition to PID filtering, the pre-parser block 124 may perform filtering on other transport packet header elements using the PID index for host selections. The pre-parser block 124 may evaluate packet continuity counts to detect packet losses or duplication and for finding and extracting clock reference values, called a program clock reference (PCR) for MPEG-2 bitstreams. The pre-parser block 124 may also evaluate a transport error indicator (TEI) in the packets of the MPEG-2 bitstreams. The TEI information may be combined with the packet error information generated by the channel interface block 122. The pre-parser block 124 may perform a splicing operation to automatically change from one audio/video PID value to another.

Regarding transport packet level status items, the pre-parser block 124 generally adds entries for a PID filter pass/fail status item and the resulting PID index. Both settings may be used for identifying PID index dependent user settings in subsequent stages 126-130 to determine what to do for what PID. Another status item may identify a payload type expected in the current packet, reflecting a pre-parser user setting used in some or all subsequent processing stages 126-130 to determine appropriate processing for actual payload type (e.g., to treat MPEG-2 sections and packetized elementary stream (PES) packet payload differently). The pre-parser block 124 may generate a status item indicating whether new user settings at the PID index level instructs flushing of intermediate data for payload data spanning transport packets from current packet onwards. An outcome of header filtering may be included in a status item when a performed status reflects a header filtering failure. Still another status item may identify an outcome of a continuity count evaluation. A global packet fail status item generally summarizing outcome of PID filtering, synchronization loss, packet errors (if the user choice instructs to discard packets with errors) and a continuity error (if the user choice instructs to discard the packets with continuity problems). Another status item may indicate whether a current transport packet has a program clock reference (PCR) while a user setting has been selected to evaluate and, if present, extract the PCR values. Additional entries for MPEG-2 bitstreams may include, but are not limited to, an indication whether the current transport packet is a first packet after executing a splice and an updated packet error.

The descrambler block 126 is generally responsible for bitstream descrambling. In addition, in the context of recording partial bitstreams to a hard disk (not shown) or retrieving recorded data from the hard disk, the descrambler block 126 may also perform encryption (for recording) or decryption (during playback) on top of bitstream descrambling. As the hard disk aspect may be similar to the actual bitstream descrambling, the same approach may be used for posting status items for a transport stream input signal IN received from the hard disk.

Keys (e.g., 64-bit keys) used for a bitstream descrambling process may be derived by the driver software 115. Therefore, from a transport hardware perspective, the appropriate keys may be provided as host CPU circuit 108 settings (e.g., PID index specific, up to 16 different key pairs). The bitstream keys generally make use of two key polarities, even and odd. The polarity currently not in use may be updated by specific service information (SI) data in a two stage approach involving a smartcard. In the first step, transport packets with SI data carrying control words may be subjected to appropriate transport processing. In a second step, the control words extracted by the driver software 115 may be sent to the smartcard and, if entitled, return a key.

The returned key may then be written to transport hardware key registers by the host CPU circuit 108. The keys, together with the odd/even information extracted from the actual transport header and the payload location within the transport packet, may then be used to descramble payload data. After descrambling, the subsequent stages 128 and 130 may operate on clear, descrambled payload data. The descrambler block 126 may add bitstream descrambling process status items to the descriptor status items and, if applicable, what encryption and/or decryption has been performed.

The post-parser block 128 is generally responsible for some or all post descrambling payload related processing. For each packet received, the post-parser block 128 may perform payload parsing, payload filtering and payload checking (e.g., CRC32), as specified for the user defined payload type propagated from the pre-parser block 128 via the status items.

Payload parsing of transport packets generally involves locating the packet payload and meaningful entities within the payload. Payload parsing may depend on the expected payload type, for example, locating where sections start and end for MPEG-2 section data. For all payload types, the number of different (complete or partial) payload entities may be recorded in the status items and each payload entity may have a dedicated descriptor recording associated start and end locations within the transport packet for later use in payload posting. On top of multiple entities in a single transport packet, payload parsing may also take into account that single payload entities may span over multiple transport packets (e.g., sections and PES packets in MPEG).

If a payload entity spans multiple transport packets, intermediate data storage may be employed for length counts and possibly for intermediate results of incomplete payload filtering and checking captured and retrieved at packet boundaries then stored on-chip. In the pipeline status items, a last open flag may reflect whether the last payload entity in the current transport packet carries on in later packets or not. MPEG-2 sections may represent the most complicated arrangement as each section may span over multiple transport packets and a single transport packet may carry multiple sections. A single section at the same time may span multiple packets and may be split in any possible byte arrangement.

Multiple (short) sections within a single transport packet present a challenge for processing due to the sheer number of operations involved. In order not to stall the entire pipeline in case too many sections are present, a maximum number of sections that may be processed simultaneously may be limited (e.g., eight section at most). If more sections are present, the extra data may be passed on and eventually dispatched without any processing performed. The processing of overruns may be left to the host CPU circuit 108. An overrun situation may be reflected in the status items of both the transport packet where the overrun starts (e.g., overrun start position and nine payload entities) and the transport packet where the overrun ends (e.g., a previous overrun flag).

Payload filtering generally depends on the payload type, particularly with respect to what portion of the payload may be involved in filtering. For all payload types permitting filtering, multiple (e.g., 32) different data filter processes may be performed. Each data filter may include multiple bytes (e.g., 16 bytes), individually mask bits to exclude the masked bits from comparison and for each non-masked bit, either perform positive or negative filtering. Positive filtering generally generates a pass status item if, for all bits involved, the filter reference data and the actual bitstream data completely match (e.g., a single difference may result in a filtering failure). Negative filtering may generate a pass status item if the reference data and actual bitstream data are not identical (e.g., a difference in at least one bit involved in the negative filtering). As such, negative filtering may only fail if all of the bits involved match. Overall, filtering passes if both, positive and negative filtering have passed. The mask, match and negate reference patterns (e.g., 16 bytes each) of each filter may be defined by the driver software 115 depending on what data may be passed on and what data may be discard.

The data filters may be used as a generic resource and may be applied for each PID index. At an individual PID index level, multiple (e.g., 32) select bits may enable individual filters. The final filtering outcome is generally a logical OR combination of all filters that have been enabled. For MPEG-2 bitstreams, the main application of data filtering may be for section structured SI data. Data filtering generally includes the first 16 bytes of each section or less, if the section is shorter, table identifications and version numbers being of particular interest to only pass on new table data and drop data already received during previous transmissions. As mentioned earlier, MPEG-2 sections may store intermediate status data. In particular, if data filtering cannot be completed in the current transport packet, the intermediate status for all data filters may be stored at the end of the current transport packet and retrieved for the next packet with the same PID to continue filtering. Data filtering may also be applied to other payload types such as MPEG-2 PES packets.

For an MPEG-2 PES packet payload, the user may have a further alternative to the data filter approach described above. Instead of data filters, the post-parser block 128 may use match/mask filtering for two PES header bytes (e.g., 7_flags and trick modes) and range checking for presentation timestamp (PTS) and display timestamp (DTS). When the PES header filtering is enabled for a PID index carrying PES data, no generic data filtering may be performed for the same PID index leaving both filtering methods mutually exclusive.

Payload checking is generally a CRC32 checking. The post-parser block 128 may calculate a CRC32 check from the entire incoming payload entity and compare the check against the expected value contained in the bitstream at the end of the payload entity. If the calculated and expected checks do not match, the mismatch may be recorded in the status items. Afterwards, depending on user settings, the payload entity effected may be dropped or the inconsistency may be reflected in the posted status data. Like filtering, the CRC32 calculation may span over multiple transport packets if the payload entity is not just contained in a single transport packet. Therefore, transport packet boundaries again may use intermediate data storage and retrieval.

The post-parser block 128 generally adds status information. The status items may enable the dispatcher block 130 to post meaningful portions of payload data, determine when to append status items at the end of completed payloads and determine when to issue interrupts. The payload status data is generally specific for each payload type. The following entries may be generic: (i) a number of payload items, counting both complete or partial entities and (ii) a last open flag. The payload specific descriptors may be implemented to be similar to each other. The payload specific descriptors may capture (i) start and end of the payload entity within the current transport packet, (ii) the outcome of all filtering and checking performed so far and (iii) a derived global pass/fail decision.

For the case of sections, each section status descriptor generally holds (i) a start section, (ii) and end section, (iii) table identification (TID) filtering outcome (similar to section filtering but involving only the first section byte), (iv) a CRC fail and (v) an outcome of data filtering. Status items may reflect both the individual outcome of each of the data filters taking into account what filters were enabled and, if posted as a status descriptor, immediately allowing the host CPU circuit 108 to determine (i) what filters finally made data pass and (ii) a global summary flag. The global summary flag may summarize an outcome of filtering and CRC32 checking. The CRC fail, filter fail and global fail flags may be kept cleared as long as no final decision may be available (e.g., for filtering until the last filtering byte has been processed). Additional section specific entries may include, but are not limited to, a previous overrun item and a start overrun item indicating where an unprocessed section starts. Other status item arrangements may be implemented for other payload types.

The dispatcher block 130 may be a final pipeline stage. The dispatcher block 130 generally posts transport packet data according to user setting in all of the previous stages 120-128. Data may either be posted to the dedicated A/V decoder circuit 110 or to the cyclic buffers 118*a-n* in the off-chip memory circuit 104. Posted SI data may later be used by the host CPU circuit 108 to build up all tables relevant for a program of interest.

For payload posting, the dispatcher block 130 may first evaluate the status items stating the number of payload entities. Apart from the trivial case that no payload entities are present, the dispatcher block 130 may then sequentially evaluate the status item descriptors for all entities of the current transport packet. If a payload entity has not globally failed, the payload entity may be posted to the off-chip memory circuit 104. The dispatcher block 130 may determine a particular cyclic buffer 118*a-n* for writing the payload data and status items Depending on user settings, a fixed arrangement between buffers and PID indexes (e.g., a cyclic buffer 118*a-n* receives all data from a single index) or a variable arrangement based on the PID index and which payload filtering has passed may be implemented in determining an address for a cyclic buffer 118*a-n*.

After determining a particular cyclic buffer 118*a-n* to store the payload entity, the dispatcher block 130 may send appropriate payload bytes from the pipeline memory buffer 132*a-e* to the respective cyclic buffer 118*a-n* in the off-chip memory circuit 104 using the start and the end from the packet entity's status descriptor. During posting, the dispatcher block 130 may also keep track of the last off-chip memory address written to, including wrapping from a buffer end to buffer start and retrieval/storage of address last written to for a cyclic buffer 118*a-n*.

When an entire payload entity has been posted, the dispatcher block 130 may evaluate a completeness of the posted information. A packet entity may only be incomplete when the packet entity is the last entity in the current packet and the last open flag is set. For a complete entity, the dispatcher block 130 generally knows that data posted to a cyclic buffer 118*a-n* is valid and complete and thus may not have to be rewound any more. The dispatcher block 130 may now also append status items in the descriptor format to the actual payload data. Afterwards, the dispatcher block 130 may update the last valid pointer address ADD for the cyclic buffer 118*a-n* that the data was posted to and set an interrupt status bit indicating which cyclic buffer 118*a-n* has received new data. When all entities in the current transport packet have been evaluated by the dispatcher block 130 and at least one buffer interrupt status bit has been set during the current transport packet (e.g., at least one payload entity has completed successfully), the dispatcher block 130 generally issues the interrupt signal INT to inform the host CPU circuit 108 that new data is available.

The host CPU circuit 108 generally reacts to the interrupt signal INT by evaluating all buffer status bits to determine which cyclic buffer 118*a-n* has received new data. For the cyclic buffers 118*a-n* storing new data, the host CPU circuit 108 may read the address pointer register 114*a-n* holding the last valid address ADD for the cyclic buffer 118*a-n* to find out where new data ends. The host CPU circuit 108 may determine which particular cyclic buffer locations hold new data, together with the previous address pointer for the same cyclic buffer 118*a-n*, and then read the data. Status item descriptors present in the particular cyclic buffers 118*a-n* may also be retrieved by the host CPU circuit 108.

A payload entity that has failed processing (e.g., a global fail bit is set) may be excluded from posting. A first payload entity in a transport packet may be a special case. The first payload entity may be the remainder of a payload entity that already started prior to the current transport packet that so far has passed all payload filtering/checking but now ends in the current transport packet and has a global fail flag set (e.g., because the CRC was wrong or incomplete, filtering now fails) Therefore, the data already posted to the off-chip memory circuit 104 prior to the current transport packet may have to be invalidated. Invalidation may be accomplished by rewinding the posting address to the last valid address pointer so that new data may overwrite the invalid data. When the dispatcher block 130 has completed all data posting for the current transport packet, updated the last valid pointers and updated the interrupt status bits as appropriate, the dispatcher block 130 may return the pipeline memory buffer 132*a-e* to the channel interface block 120.

In one embodiment, the pipeline memory buffers 132*a-e* may be organized in 16-bit words. Status items generally start at a predetermined word (e.g., word 188) of each pipeline memory buffer 132*a*-*e*. Space may be provided for two MPEG-2 transport packets prior to the status items. In addition to clear, descrambled data, the pipeline block 120 may be used to pass along an encrypted packet version in the context of hard disk recording.

All essential aspects of gathering and posting status data may be explained in the context of MPEG-2 transport packets carrying section data. MPEG-2 transport packets carrying section data may represent a complex case and the benefit rising from providing status items in the off-chip-memory circuit 104 may be greatest. However, other data arrangements may be used to meet the design criteria of a particular application.

Figure 3:
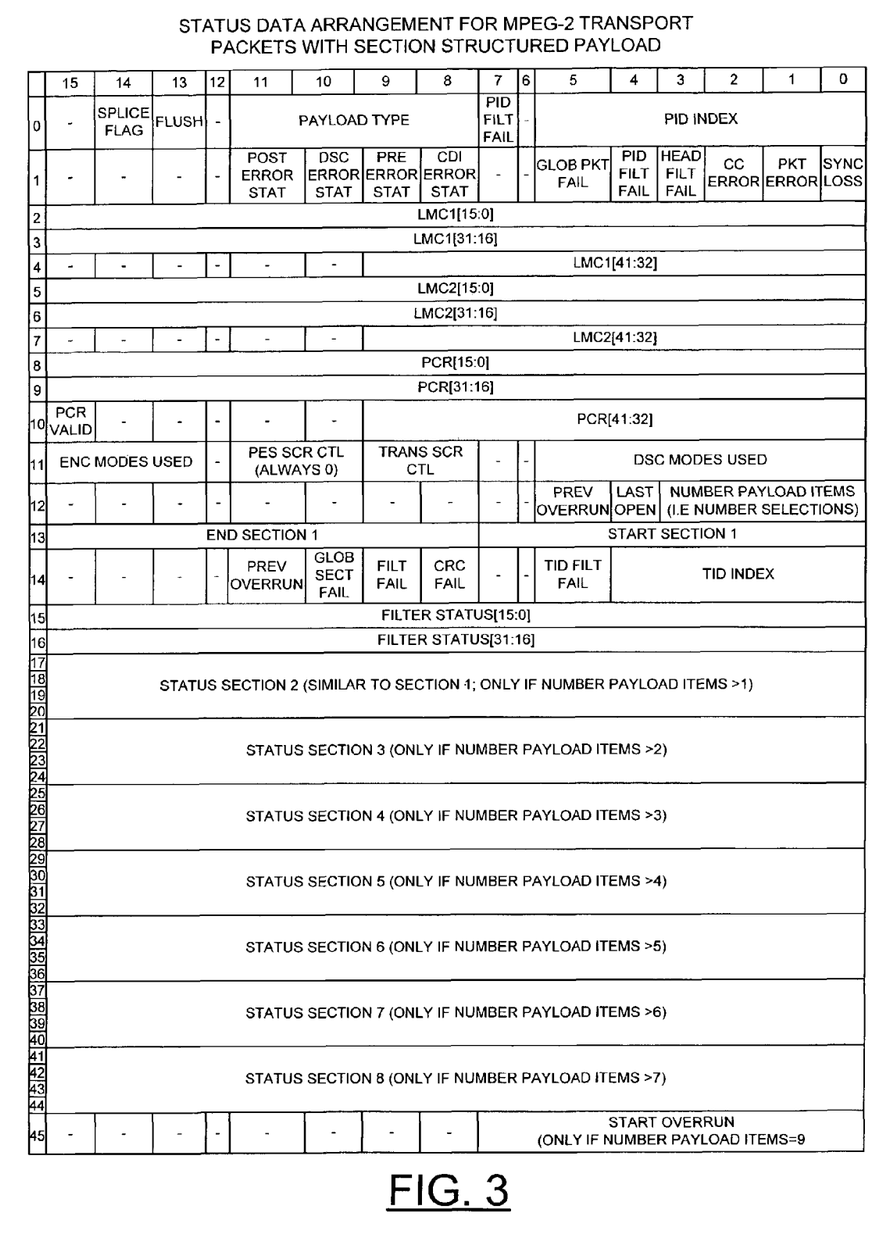
FIG. 3 is a diagram of an example arrangement for status items for a transport packet with a section structured payload.
Figure 4:
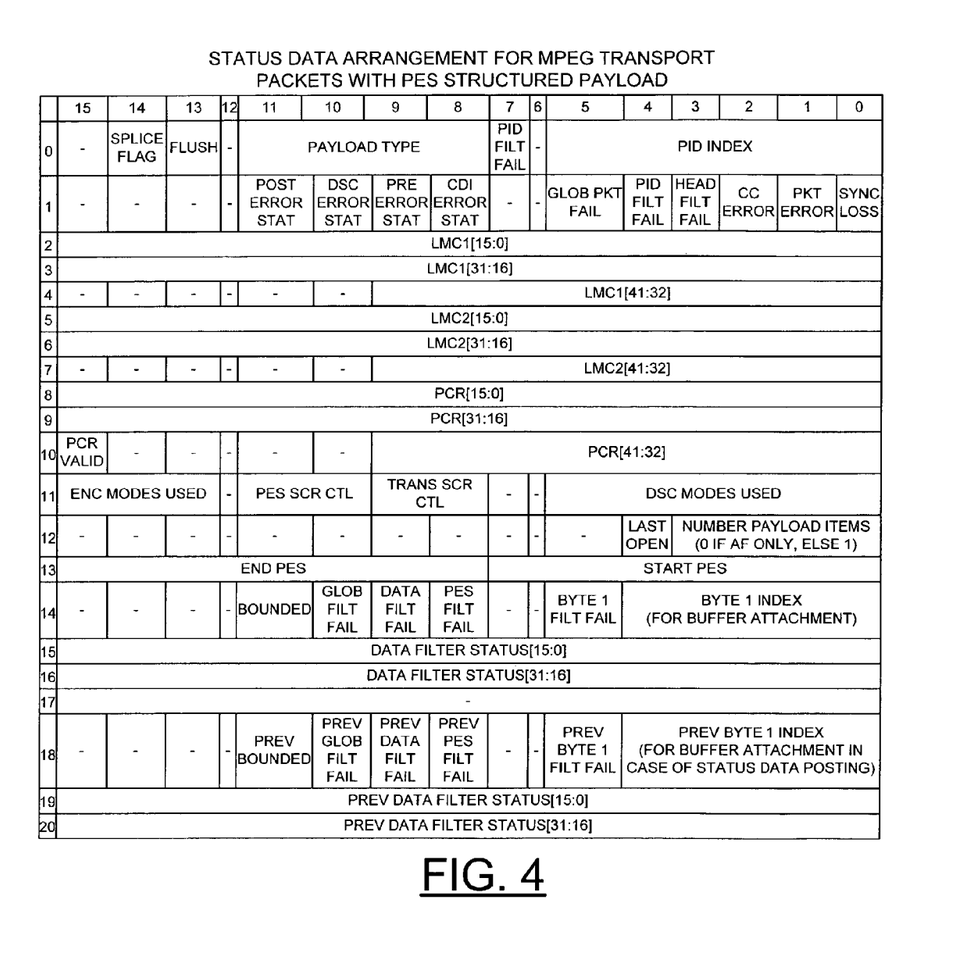
FIG. 4 is a diagram of an example arrangement for status items for a transport packet with a packetized elementary stream (PES) structured payload.

Referring to FIG. 3, a diagram of an example arrangement for status items for a transport packet with a section structured payload is shown. Referring to FIG. 4, a diagram of an example arrangement for status items for a transport packet with a PES structured payload is shown. Many of the status items illustrated may be generated by one of the blocks 120-130. Several of the status items may be added to by two or more blocks 120-130. Other arrangements may be implemented to meet the design criteria of a particular application. The payload types supported for MPEG may be summarized in TABLE I as follows:

TABLE I

| PAYLOAD TYPE | MEANING |
| --- | --- |
| 0000 | Section |
| 0001 | non-A/V PES |
| 0010 | A/V PES |
| 0011 | Private |
| 0100 | ECM |
| 0101 | EMM |

The differentiation between A/V PES and non-A/V PES may be relevant for data dispatching routing between the A/V decoder circuit 110 and the off-chip memory circuit 104.

For section structured payload data, the control structure may contain a separate descriptor with the same set of syntax elements for each section. As explained above, the post-parser block 128 may be able to deal with up to 8 sections in a single transport packet. Therefore, it is possible to have up to 8 section descriptors. The number of sections actually present may be indicated by the number of payload items descriptor. If a packet carries more sections, all sections beyond the first 8 may not be processed by the post-parser block 128. Instead, the extra section data may be unconditionally posted and the evaluation may be completely left to the driver software 115. The last section in a transport packet with an overrun may span into the next transport packet(s) under the same PID. As all section lengths beyond section 8 may not have been evaluated, there may be no way to determine during the current transport packet how many sections exist and whether the last section may continue in the next transport packet or not.

To recover from an overrun during the next transport packet(s) under the same PID, the post-parser block 128 may keep track of the overrun situation and retain special processing until locating the beginning of a new section. The new section may either coincide with a packet boundary or start within the current packet. To avoid duplicating overrun tracking in the dispatcher block 130, the post-parser block 128 may update an additional bit to the control structure (e.g., previous overrun). Setting the previous overrun bit generally indicates that the previous transport packet may have ended with an overrun.

Aspects of status item posting may be controlled on a PID index basis. By way of example, for each individual PID index, the host CPU circuit 108 may individually determine whether to post status items and to what level of detail. Payload and transport packet status item posting may be controlled individually. For all status item postings, data re-organization may be minimized in order to minimize processing overhead for microcode in the dispatcher block 130. Therefore, the status item words (e.g., 32-bits) may be as similar to the original pipeline memory buffer arrangement as possible.

Figure 5:
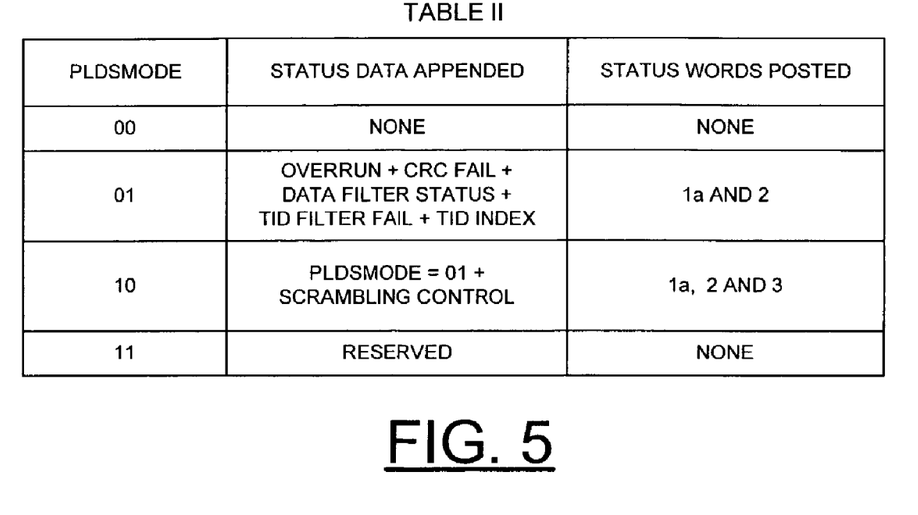
FIG. 5 is a table summarizing posted status words for section payloads.
Figure 6:
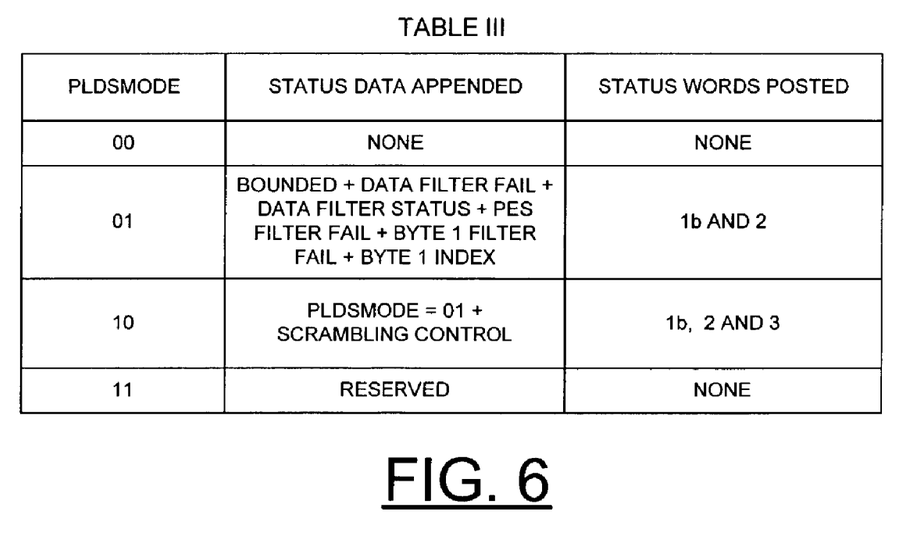
FIG. 6 is a table summarizing posted status words for PES payloads.
Figure 7:
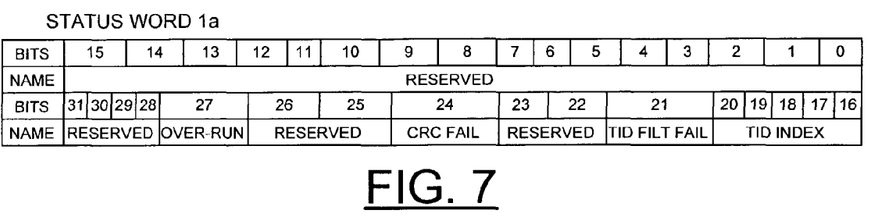
Figure 8:
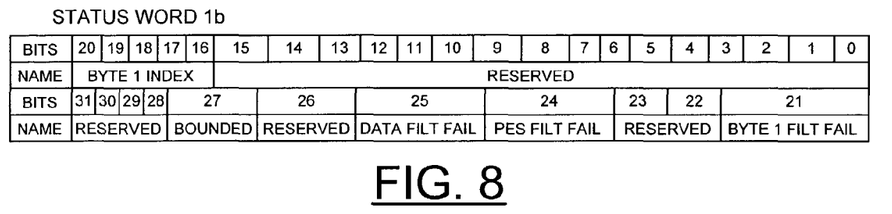
FIG. 8 is an example layout of a status word 1b.
Figure 9:
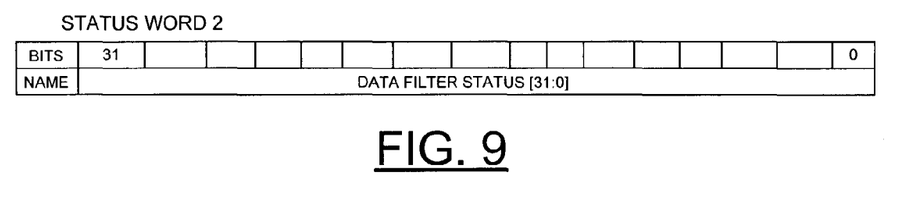
FIG. 9 is an example layout of a status word 2.
Figure 10:
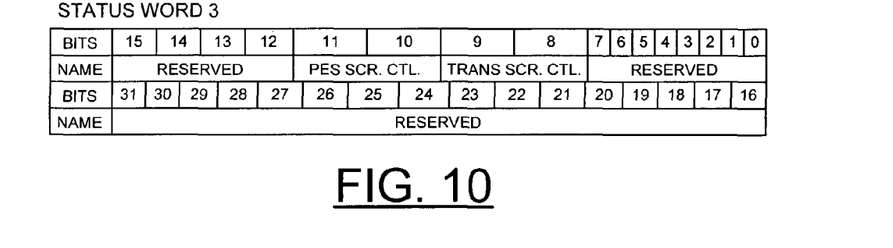
FIG. 10 is an example layout of a status word 3.

Referring to FIGS. 5 and 6, tables summarizing posted status words for section (TABLE II) and PES (TABLE III) payloads are shown. TABLE II and TABLE III generally illustrate how a user mode setting (PLDSMODE) may control what portion of the payload status items may be posted. The status words referred to in the tables are generally shown in FIGS. 7-10. For an MPEG-2 transport stream input signal IN, the payload status items may be appended for section and PES payloads. Entitlement Control Message (ECM) and Entitlement Management Message (EMM) information may be posted packet oriented and for private data no relevant status data may be available.

Figure 11:
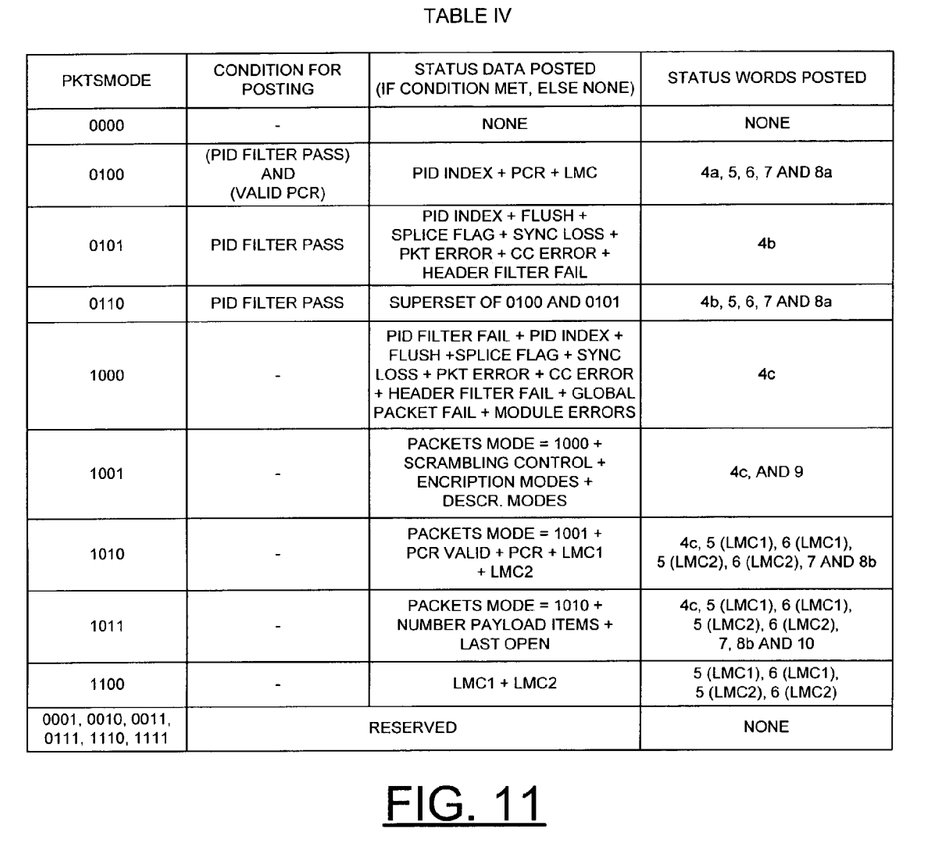
FIG. 11 is a table summarizing posted status words for a dedicated transport packet status buffer.
Figure 12:
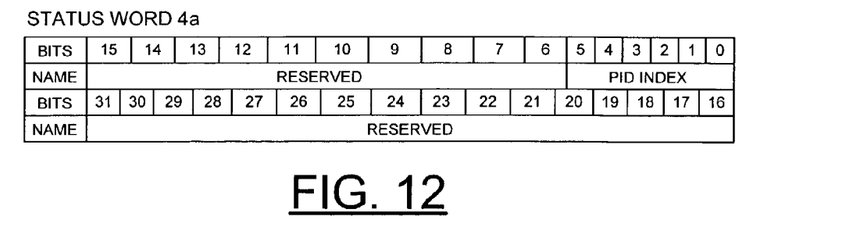
Figure 13:
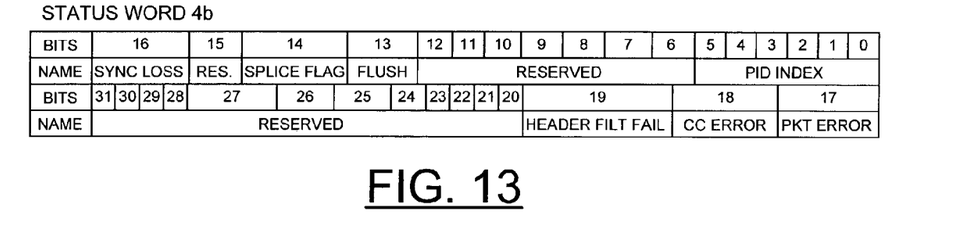
FIG. 13 is an example layout of a status word 4b.
Figure 14:
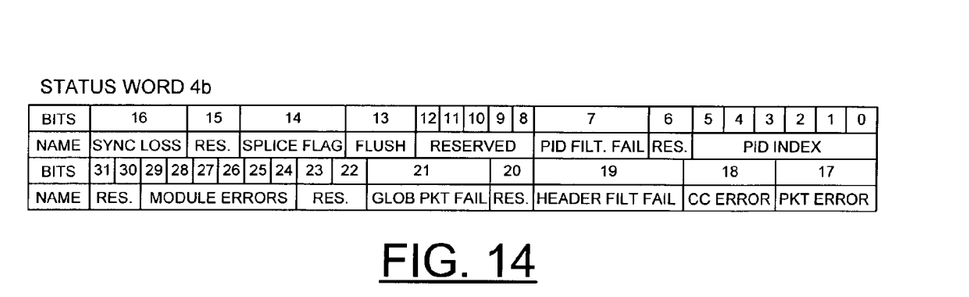
FIG. 14 is an example layout of a status word 4c.
Figure 15:
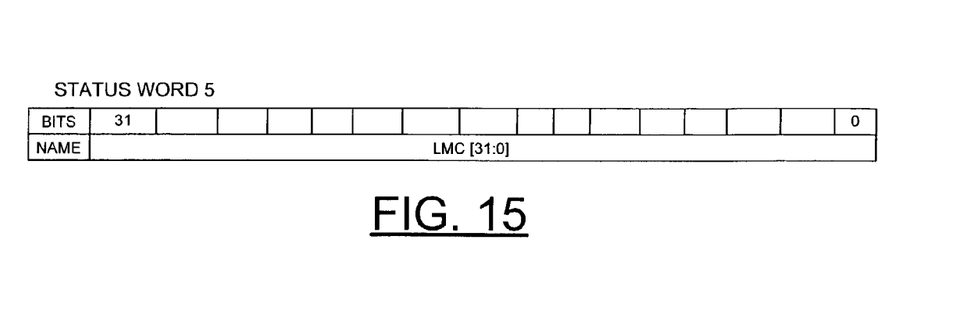
FIG. 15 is an example layout of a status word 5.
Figure 16:
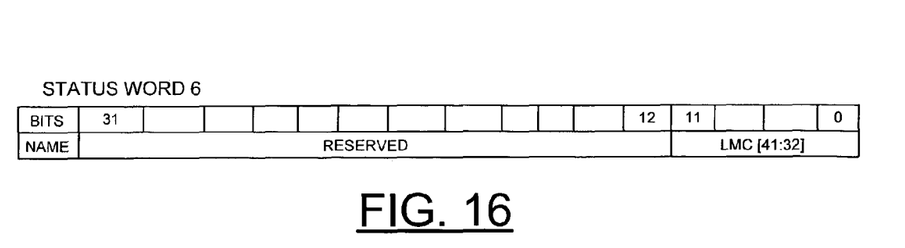
FIG. 16 is an example layout of a status word 6.
Figure 17:
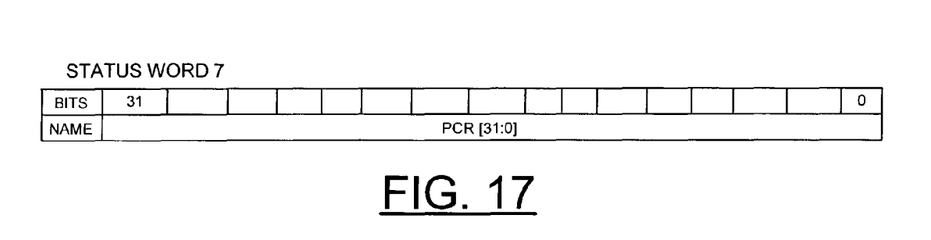
FIG. 17 is an example layout of a status word 7.
Figure 18:
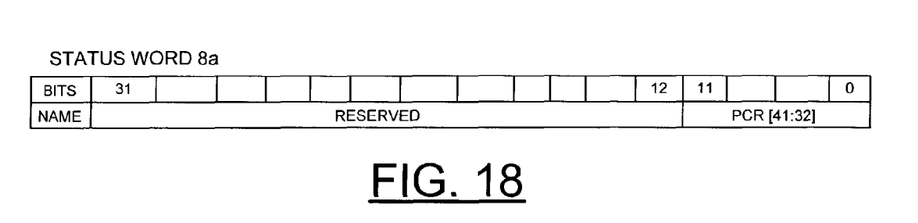
Figure 19:
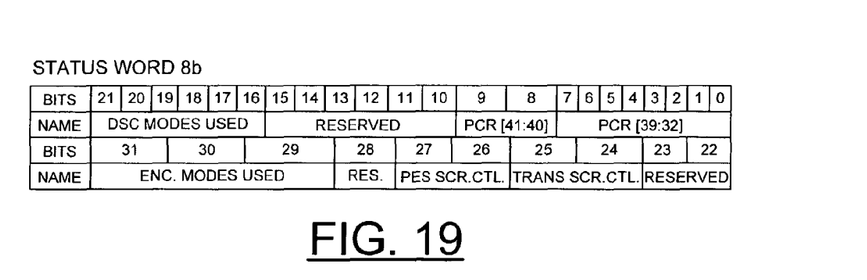
FIG. 19 is an example layout of a status word 8b.
Figure 20:
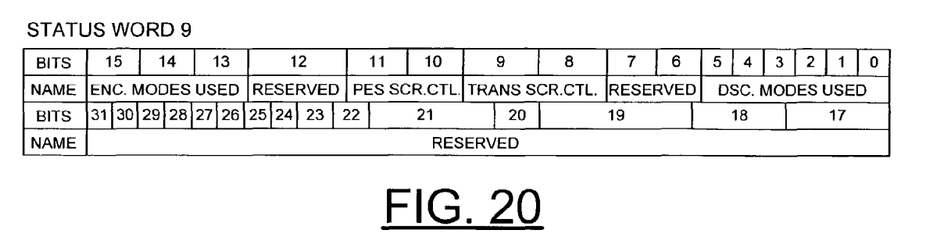
FIG. 20 is an example layout of a status word 9.
Figure 21:
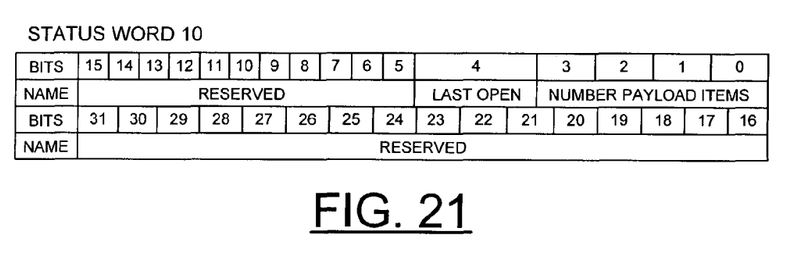
FIG. 21 is an example layout of a status word 10.

Referring to FIG. 11, a table summarizing posted status words for a dedicated transport packet status buffer is shown. TABLE IV generally illustrates a packet mode (e.g., PKTS-MODE) value in relationship to the status data or items posted and a status word used to hold the information. A column listing conditions for posting packet level status data is included in TABLE IV. The "unconditional" modes may be intended for debug purposes. The status words referred to are generally shown in FIGS. 12-21.

The transport packet level status data may be made available by positing to a single, dedicated cyclic buffer in the off-chip memory circuit 104. The shared cyclic buffer generally receives the status data from all the PID indexes that have transport packet level status data posting enabled. The selection whether to post transport packet level status data and if yes, what portion, may be made at the PID index level. Different combinations of status words may be posted per the intended user choices indicated by PKTSMODE. Additional packet level status data may be posted when certain conditions may be met. The conditions generally limit the amount of status data (and the interrupts resulting from status posting) to avoid flooding the host CPU circuit 108 with unneeded information. The conditional modes may be mainly intended for debug purposes.

Variations on the STB chip 102 may be implemented within the scope of the present invention. For example, in the context of using a pipeline block 120 for passing status information from stage to stage, arrangements other than the 16-bit wide arrangements described above may be implemented to meet the design criteria of a particular application. The pipeline block 120 may be implemented using sequential data shifting rather than memory passing. The pipeline structure for the transport demultiplexer circuit 106 may be increased or decreased to accommodate other divisions of functionality among processing stages or blocks.

The present invention may also be implemented by the preparation of ASICs, FPGAS, or by interconnecting an appropriate network of conventional component circuits (such as conventional circuit implementing a state machine), as is described herein, modifications of which will be readily apparent to those skilled in the art(s). As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for processing a transport stream, comprising the steps of:
   (A) parsing said transport stream with a transport demultiplexer to separate a first transport packet;
   (B) parsing a second transport packet from said transport stream;
   (C) generating a plurality of status items in response to filtering said first transport packet with a plurality of filters; each of said status items indicating one of (i) a pass state and (ii) a fail state corresponding to a respective one of said filters;
   (D) extracting a plurality of status data from said first transport packet, said status data including (i) a number of payload items and (ii) a last open flag, wherein said number of payload items indicates how many sections are in a section structured payload;
   (E) writing (i) not more than a first portion of said first transport packet, (ii) said status items and (iii) said status data together from said transport demultiplexer to a memory;
   (F) writing a second portion of said second transport packet in said memory between said first portion and said status items;
   (G) reading said first portion, said second portion, said status items and said status data from said memory to a processor;
   (H) generating configuration information with said processor by processing said first portion as read from said memory based upon said status items and said status data;
   (I) generating an intermediate signal using said transport demultiplexer in response to said configuration information; and
   (J) generating an output signal by decoding said intermediate signal.

2. The method according to claim 1, further comprising the step of:
   generating a synchronizing item of said status items in response to synchronizing said first transport packet as parsed from said transport stream relative to a clock signal, said synchronization item having said fail state in response to a loss of synchronization.

3. The method according to claim 1, further comprising the step of:
   generating a filter item of said status items in response to filtering an identification value from said first transport packet, said filter item having said pass state in response to said identification value in said first transport packet matching at least one of a plurality of user defined values.

4. The method according to claim 1, further comprising the steps of:
   generating a descrambled packet by bitstream descrambling said first transport packet; and
   generating a descramble item of said status items in response to descrambling said first transport packet, wherein said descramble item indicates a descramblinq process status.

5. The method according to claim 4, further comprising the step of:
   generating a payload item of said status items in response to filtering a payload in said descrambled packet, said payload item having said pass state in response to a plurality of bits of said payload matching a reference data.

6. The method according to claim 1, further comprising the step of:
   generating an interrupt to said processor after storing said first portion, said status items and said status data in said memory.

7. The method according to claim 1, wherein said transport stream comprises digital video.

8. The method according to claim 1, further comprising the step of:
   receiving a mode setting from a user.

9. The method according to claim 8, further comprising the step of:
   storing one of a plurality of predefined subsets of said status items in said memory based upon said mode setting.

10. A circuit comprising:
    a memory;
    a transport demultiplexer configured to (i) parse a first transport stream to separate a first transport packet, (ii) generate a plurality of status items in response to filtering said first transport packet with a plurality of filters, each of said status items indicating one of (a) a pass state and (b) a fail state corresponding to a respective one of said filters, (iii) extract a plurality of status data from said first transport packet, said status data including (a) a number of payload items and (b) a last open flag, (iv) write (a) not more than a first portion of said first transport packet, (b) said status items, (c) said status data, and (d) a second portion of a second transport packet between said first portion and said status items together in said memory and (v) generate an intermediate signal in response to configuration information, wherein said number of payload items indicates how many sections are in a section structured payload;
    a processor configured to (i) read said first portion, said second portion, said status items and said status data from said memory and (ii) generate said configuration information by processing said first portion as read from said memory based upon said status items and said status data; and
    a decoder configured to generate an output signal by decoding said intermediate signal.

11. The circuit according to claim 10, wherein said memory comprises:
    a plurality of cyclic buffers, each configured to store at least one set comprising said first portion, said status items and said status data.

12. The circuit according to claim 11, wherein said transport demultiplexer is further configured to:
    generate a pointer carrying an address of a particular one of said cyclic buffers holding said first portion.

13. The circuit according to claim 11, wherein each of said cyclic buffer holds only said sets having a common packet identification value.

14. The circuit according to claim 10, wherein said transport demultiplexer is further configured to:
    appended said status items and said status data to said first portion prior to storing in said memory.

15. The circuit according to claim 10, wherein said transport demultiplexer comprises:

a pipeline having a plurality of buffers each sized to stored both said first transport packet and said second transport packet simultaneously.

16. The circuit according to claim 15, wherein a mode setting received from a user determines one of a plurality of predefined subsets of said status items to write to said memory.

17. The circuit according to claim 15, wherein said transport demultiplexer further comprises:
- a first stage configured to store said first transport packet in a first buffer of said buffers;
- a second stage configured to perform identification filtering on said first transport packet as stored in said first buffer;
- a third stage configured to bitstream descramble said first transport packet as stored in said first buffer;
- a fourth stage configure to parse a payload from said first transport packet as stored in said first buffer; and
- a fifth stage configured to write said first portion from said first buffer to said memory.

18. A circuit comprising:
- means for (i) parsing a first transport stream to separate a first transport packet, (ii) generating a plurality of status items in response to filtering said first transport packet with a plurality of filters, each of said status items indicating one of (a) a pass state and (b) a fail state corresponding to a respective one of said filters, (iii) extracting a plurality of status data from said first transport packet, said status data including (a) a number of payload items and (b) a last open flag, (iv) writing (a) not more than a first portion of said first transport packet, (b) said status items, (c) said status data, and (d) a second portion of a second transport packet between said first portion and said status items together in said memory and (v) generating an intermediate signal in response to configuration information, wherein said number of payload items indicates how many sections are in a section structured payload;
- means for (i) reading said first portion, said second portion, said status items and said status data from said memory and (ii) generating said configuration information by processing said first portion as read from said memory based upon said status items and said status data; and
- means for generating an output signal by decoding said intermediate signal.

* * * * *